US012344401B2

(12) United States Patent
Toida et al.

(10) Patent No.: US 12,344,401 B2
(45) Date of Patent: Jul. 1, 2025

(54) CRANE, CRANE BODY, AND MOBILE UNIT

(71) Applicant: SUMITOMO HEAVY INDUSTRIES CONSTRUCTION CRANES CO., LTD., Tokyo (JP)

(72) Inventors: Minoru Toida, Tokyo (JP); Kohei Honjo, Aichi (JP); Katuaki Kamashima, Tokyo (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 919 days.

(21) Appl. No.: 17/511,105

(22) Filed: Oct. 26, 2021

(65) Prior Publication Data

US 2022/0041410 A1    Feb. 10, 2022

Related U.S. Application Data

(63) Continuation of application No. PCT/JP2020/017532, filed on Apr. 23, 2020.

(30) Foreign Application Priority Data

Apr. 26, 2019   (JP) .................................. 2019-086285

(51) Int. Cl.
| | | |
|---|---|---|
| *B64F 3/02* | (2006.01) | |
| *B64U 10/13* | (2023.01) | |
| *B64U 50/19* | (2023.01) | |
| *B64U 50/34* | (2023.01) | |
| *B64U 101/30* | (2023.01) | |

(52) U.S. Cl.
CPC ................ *B64F 3/02* (2013.01); *B64U 50/34* (2023.01); *B64U 10/13* (2023.01); *B64U 50/19* (2023.01); *B64U 2101/30* (2023.01)

(58) Field of Classification Search
CPC .................................. B64C 39/022; B64F 3/02
See application file for complete search history.

(56) References Cited

U.S. PATENT DOCUMENTS

| | | | |
|---|---|---|---|
| 10,033,187 B2 | 7/2018 | Kasai et al. | |
| 11,923,110 B2 * | 3/2024 | Kaneko | ................ H01B 7/0009 |

FOREIGN PATENT DOCUMENTS

| | | |
|---|---|---|
| CN | 109289139 A | 2/2019 |
| JP | 2732582 B2 | 12/1997 |
| JP | 2011-095848 A | 5/2011 |
| JP | 2012-131600 A | 7/2012 |
| JP | 2013-129469 A | 7/2013 |
| JP | 2016-181119 A | 10/2016 |
| JP | 2017-027355 A | 2/2017 |

(Continued)

OTHER PUBLICATIONS

Search Report issued in European Application No. 20795252.4, mailed Jun. 22, 2022.

(Continued)

*Primary Examiner* — Ryan Johnson
(74) *Attorney, Agent, or Firm* — Michael Best & Friedrich LLP

(57) ABSTRACT

There is provided a crane including a crane body, and a mobile unit moving around the crane body. The crane body includes a power supply unit, and includes a power supply path member connected to the mobile unit and supplying power to the mobile unit from the power supply unit.

19 Claims, 10 Drawing Sheets

(56) References Cited

FOREIGN PATENT DOCUMENTS

| | | |
|---|---|---|
| JP | 2018-095394 A | 6/2018 |
| JP | 2018-188250 A | 11/2018 |
| WO | WO-2020008582 A1 * | 1/2020 |

OTHER PUBLICATIONS

International Search Report issued in Application No. PCT/JP2020/017532, mailed Jun. 2, 2020.

* cited by examiner

CRANE, CRANE BODY, AND MOBILE UNIT

RELATED APPLICATIONS

The contents of Japanese Patent Application No. 2019-086285, and of International Patent Application No. PCT/JP2020/017532, on the basis of each of which priority benefits are claimed in an accompanying application data sheet, are in their entirety incorporated herein by reference.

BACKGROUND

Technical Field

Certain embodiments of the present invention relate to a crane, a crane body, and a mobile unit.

Description of Related Art

In order to ensure satisfactory visibility of a work machine, there is a technique for acquiring an image around the work machine by a mobile unit moving independently of the work machine (for example, refer to the related art).

SUMMARY

According to an embodiment of the present invention, there is provided a crane including a crane body, and a mobile unit moving around the crane body. The crane body includes a power supply unit, and includes a power supply path member connected to the mobile unit and supplying power to the mobile unit from the power supply unit.

According to another embodiment of the present invention, there is provided a crane body including a power supply that supplies power to a mobile unit moving around the crane body, and a power supply path member connected to the mobile unit and supplying the power to the mobile unit from the power supply unit.

According to still another embodiment of the present invention, there is provided a mobile unit moving around a crane body to carry out auxiliary work. The mobile unit is connected to a power supply unit provided in the crane body via a power supply path member, and receives the power supplied from the power supply unit.

DETAILED DESCRIPTION

However, since the mobile unit moves independently of the work machine, the mobile unit itself needs to include a power supply of a drive source. As capacity of the power supply increases, a weight of the power supply increases. Consequently, the capacity of the power supply is limited. Therefore, there is a problem in that the mobile unit is unlikely to be operated for a long period of time.

It is desirable to enable a long-term operation of a mobile unit.

According to the present invention, the mobile unit can be operated for a long period of time.

Schematic Configuration of Embodiment of Invention

Figure 1:
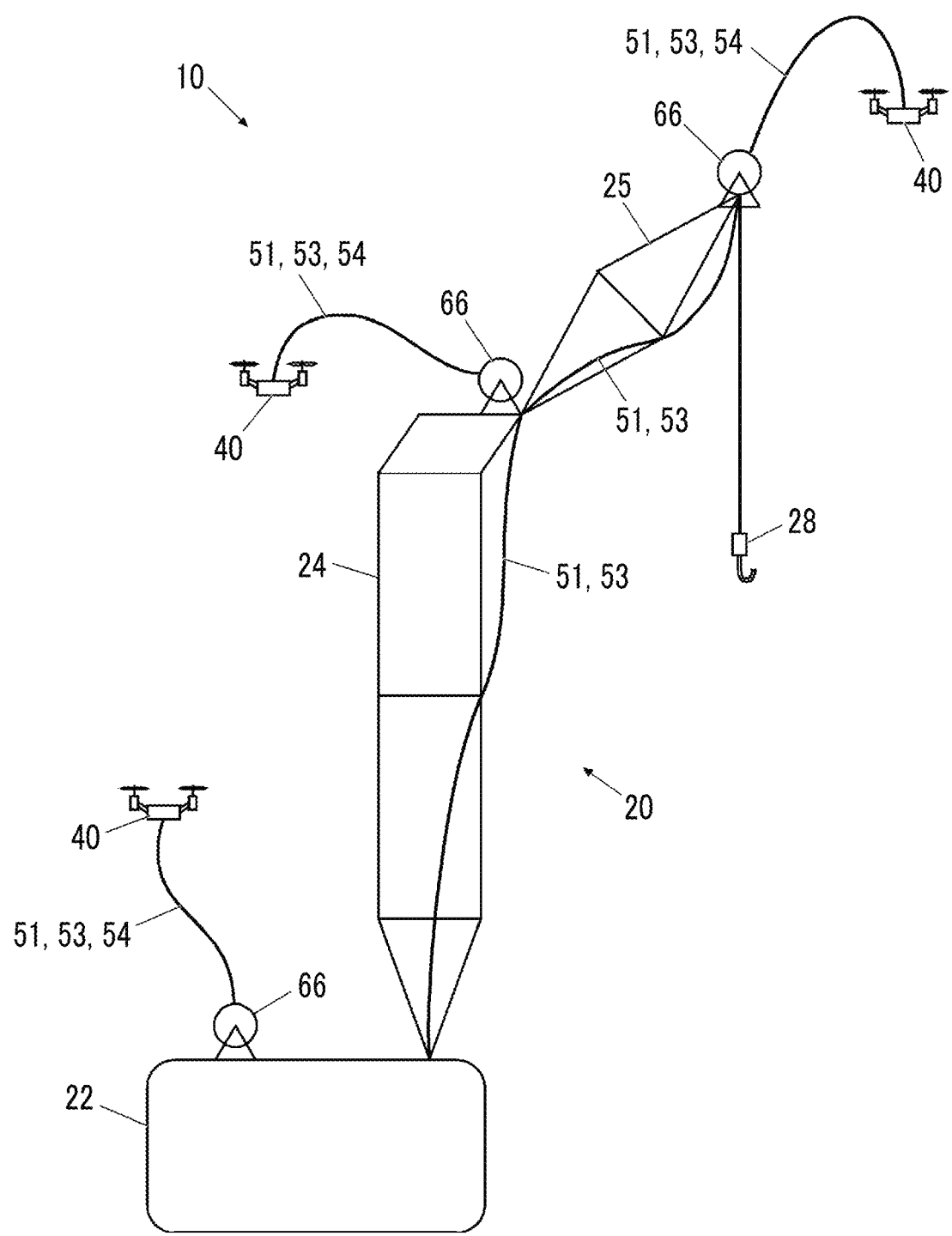
FIG. 1 is a view for describing a schematic configuration of a crane according to an embodiment of the present invention.

FIG. 1 is a schematic view of a crane according to an embodiment of the present invention.

As illustrated in FIG. 1, a crane 10 is configured to mainly include a crane body 20 and a plurality of mobile units 40 moving around the crane body 20.

Each of the mobile units 40 is configured as follows. A tip portion of a power supply cable 51 serving as a power supply path member unwound from a self-winding cord reel 66 serving as a winding mechanism provided at each position of an upper part of a rotating platform. 22 (to be described later), an upper end part of a tower boom 24 (to be described later), and a tip portion of a tower jib 25 (to be described later) in the crane body 20 is connected to each of the mobile units 40. Each of the mobile units 40 receives power supply from the crane body 20.

One end portion of the power supply cable 51 is physically and electrically connected to the mobile unit 40 side, and the other end is physically and electrically connected to the crane body 20 side.

Then, the power supply cable 51 is wound around and integrated with a fall prevention wire rod 54 formed of a high-tensile reinforced wire together with an information transmission line 53 serving as an information transmission path member (to be described later). The integrated wire rod also has a fall prevention function for the mobile unit 40.

Mobile Unit

The mobile unit 40 is a machine body which is a so-called drone which has a plurality of rotors, can fly by controlling an output of a motor serving as a drive source of each rotor, and can freely perform raising/lowering operations, forward/rearward/rightward/leftward movements, and positive/negative turning.

In order to carry out auxiliary work for work of the crane body 20, the mobile unit 40 moves around the crane body 20. Examples of the auxiliary work of the mobile unit 40 include imaging the crane body 20 for an inspection by a camera 41 mounted thereon, capturing a peripheral image of the crane body 20 or a bird's-eye view image of a work site, Illumination at the work site of the crane body 20 by a lighting device 47 mounted thereon, and assisting load suspending work by causing a gripping device 48 mounted thereon to grip an assist rope, but are not limited thereto.

Figure 2:
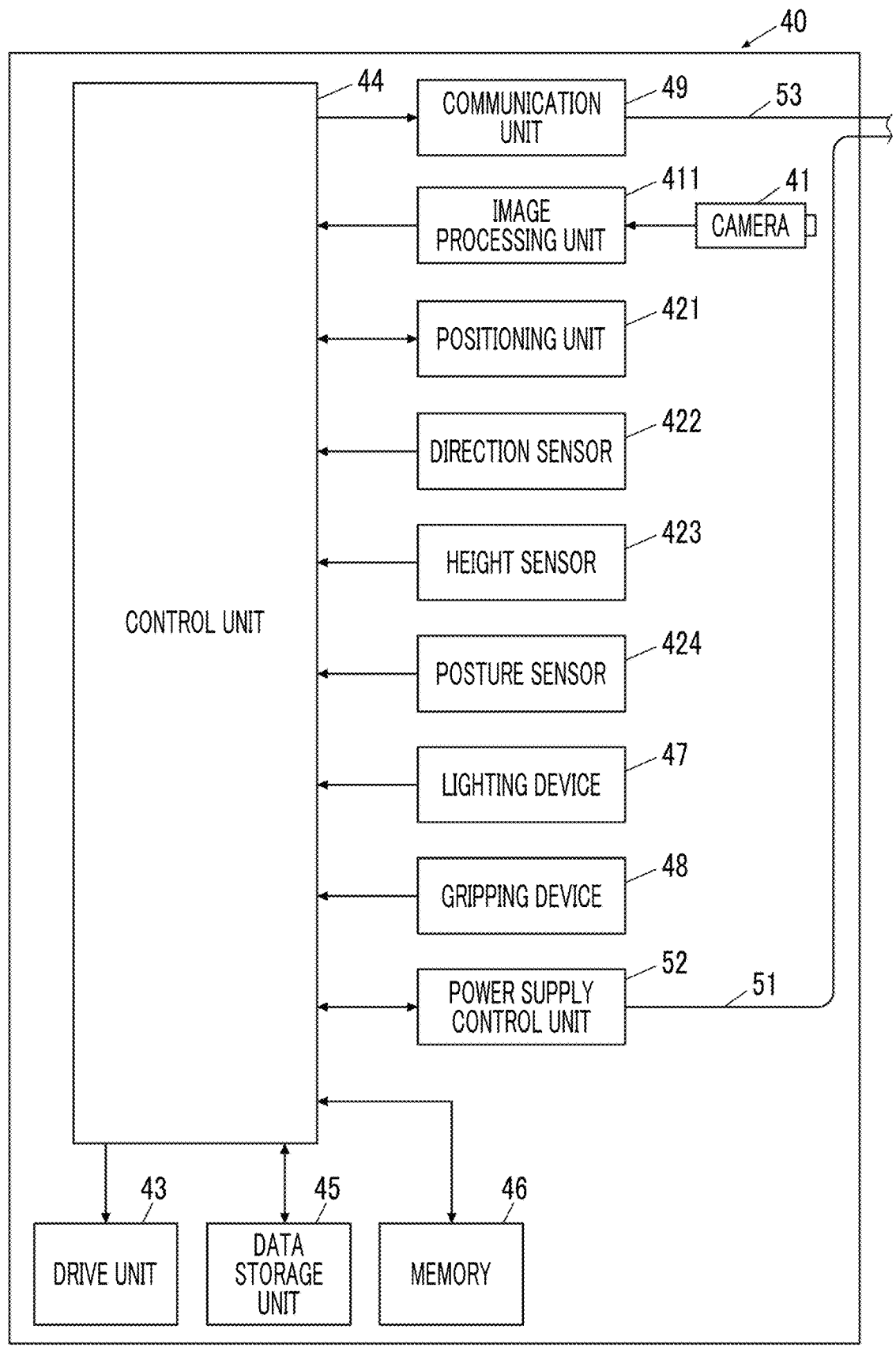
FIG. 2 is a block diagram illustrating a control system of a mobile unit.

As illustrated in FIG. 2, the mobile unit 40 includes the camera 41 serving as an imaging unit, a positioning unit 421, a direction sensor 422, a height sensor 423, a posture sensor 424, a drive unit 43, a control unit 44, a data storage unit 45, a memory 46, the lighting device 47, the gripping device 48, and a communication unit 49.

The camera 41 is supported to be directed in a predetermined direction from the machine body of the mobile unit 40, and images a scene ahead of the line of sight in accordance with a direction of the machine body. An image signal obtained by imaging is output to an image processing unit 411 connected to the camera 41. Captured image data having a predetermined format is generated by the image processing unit 411, and is stored in the memory 46.

The positioning unit 421 is a global navigation satellite system (GNSS) receiver of a global positioning system (GPS), and measures a current position of the mobile unit 40.

The direction sensor 422 is a three-axis gyro azimuth sensor, and detects an advancing direction of the mobile unit 40 and a tilt angle of the machine body.

For example, the height sensor 423 is an optical type, and projects light downward to detect a height of the machine body from a phase difference generated by reflected light thereof.

The posture sensor 424 includes a three-dimensional acceleration sensor, and detects acceleration in each direction of an X-axis, a Y-axis, and a Z-axis which are defined in the mobile unit 40. A posture of the machine body can be detected from gravitational acceleration detected for each of these axes.

The communication unit 49 is connected to one end portion of an information transmission line 53 that connects the mobile unit 40 and the crane body 20, and performs wired communication with a crane terminal 30 of the crane body 20.

For example, the communication unit 49 receives an external operation command for the mobile unit 40, and outputs the operation command to the control unit 44. In addition, the communication unit 49 transmits captured image data of the camera 41 to the crane terminal 30. The crane terminal 30 displays the received captured image data, or transmits the received captured image data to an external server.

The drive unit 43 is configured to output a thrust for a movement operation of the mobile unit 40, and has a plurality of rotors and a plurality of motors serving as rotation drive sources provided for each rotor. Each motor is controlled by the control unit 44 so that the machine body moves in a target movement direction.

The data storage unit 45 is a non-volatile storage device that stores various information relating to a control program and control of the mobile unit 40.

The memory 46 stores captured image data obtained by imaging of the camera 41.

The control unit 44 is a so-called controller, and controls each of the above-described configurations of the mobile unit 40.

The lighting device 47 includes a light source and an optical system, and is supported to project light from a machine body of the mobile unit 40 in a direction the same as that of the camera 41.

The gripping device 48 includes a gripping portion and an actuator, and can switch between gripping and releasing an end portion of the assist rope.

In addition, a power source such as a battery for supplying power to each of the above-described configurations is not mounted on the mobile unit 40. Instead, a power supply cable 51 serving as a power supply path member for supplying the power to the mobile unit 40 from the crane body 20 is drawn into the mobile unit 40.

One end portion of the power supply cable 51 is connected to a power supply control unit 52, and the power supply control unit 52 supplies required power to each configuration of the mobile unit 40.

The present invention does not inhibit a battery from being mounted on the mobile unit 40, and a small battery may be mounted in a case of an abnormality in which power supply is interrupted from the crane body 20.

In addition, in some cases, a battery such as a fine battery that does not supply the power to the drive unit 43, for example, a battery for continuously operating a built-in clock of the control unit 44, or a battery for backup may be mounted on the mobile unit 40.

Crane Body

The crane body 20 will be described with reference to FIG. 3. Here, a so-called mobile type tower crane will be described as an example of the crane body 20. In describing the crane body 20 below, a forward moving direction of the crane body 20 (regardless of a facing direction of a rotating platform 22, a predetermined forward moving direction of a lower traveling body 21) will be defined as "front". A rearward moving direction will be defined as "rear". A left hand side in a state of facing the front will be defined as "left". A right hand side in a state of facing the front will be defined as "right".

As illustrated in the drawing, the crane body 20 is configured to include the lower traveling body 21 having a crawler type that can travel by itself, the rotating platform 22 mounted on the lower traveling body 21 to be capable of turning, and a front attachment 23 attached to a front side of the rotating platform 22 to be capable of derricking.

The rotating platform 22 configures a crane body of the crane body 20, and has a turning frame 221 extending in forward and rearward directions. A boom attachment portion 222 is provided on a front side of the turning frame 221, and a base end 249 of the tower boom 24 (to be described later) is attached to the boom attachment portion 222 to be capable of derricking.

In addition, in the turning frame 221, a mast attachment portion 223 is provided in the vicinity of a rear side of the boom attachment portion 222. A base end of the mast 224 (to be described later) is attached to the mast attachment portion 223 to be pivotable. Furthermore, in the turning frame 221, a base end of a backstop 225 (to be described later) is attached to a rear side of the mast attachment portion 223 to be pivotable.

A counterweight 226 for balancing a weight between the front attachment 23 and a suspended load is arranged on the rear side of the turning frame 221. In addition, a boom derricking winch (not illustrated) is arranged on the rear side of the turning frame 221. On the other hand, a cab 227 in which a driver's seat and various manipulation devices (all are not illustrated) are disposed is provided on front right side of the turning frame 221.

The front attachment 23 is provided in the rotating platform 22, and transports luggage such as materials between the ground and a high place. The front attachment 23 is configured to include the tower boom 24, the tower jib 25, and a tower strut 26.

The tower boom 24 is attached to the rotating platform 22 to be capable of derricking. The tower boom 24 is configured to include a lower boom 241 whose base end (foot portion) 249 is attached to the boom attachment portion 222 of the turning frame 221 to be capable of derricking, a plurality of (for example, three stages) intermediate booms 242 whose base end is attached to a tip of the lower boom 241, and an upper boom 243 attached to a tip of the intermediate boom 242 located on a most tip side. A jib derricking winch 244 and a main winding winch 245 (to be described later) are attached to the lower boom 241.

As illustrated in the drawing, each pillar member of the intermediate booms 242 adjacent to each other in a length direction is connected by using a connecting pin. In addition, the intermediate boom 242 located on a lowermost side and the lower boom 241, and the intermediate boom 242 located on an uppermost side and the upper boom 243 are respectively connected to each other by using the connecting pins.

Figure 3:
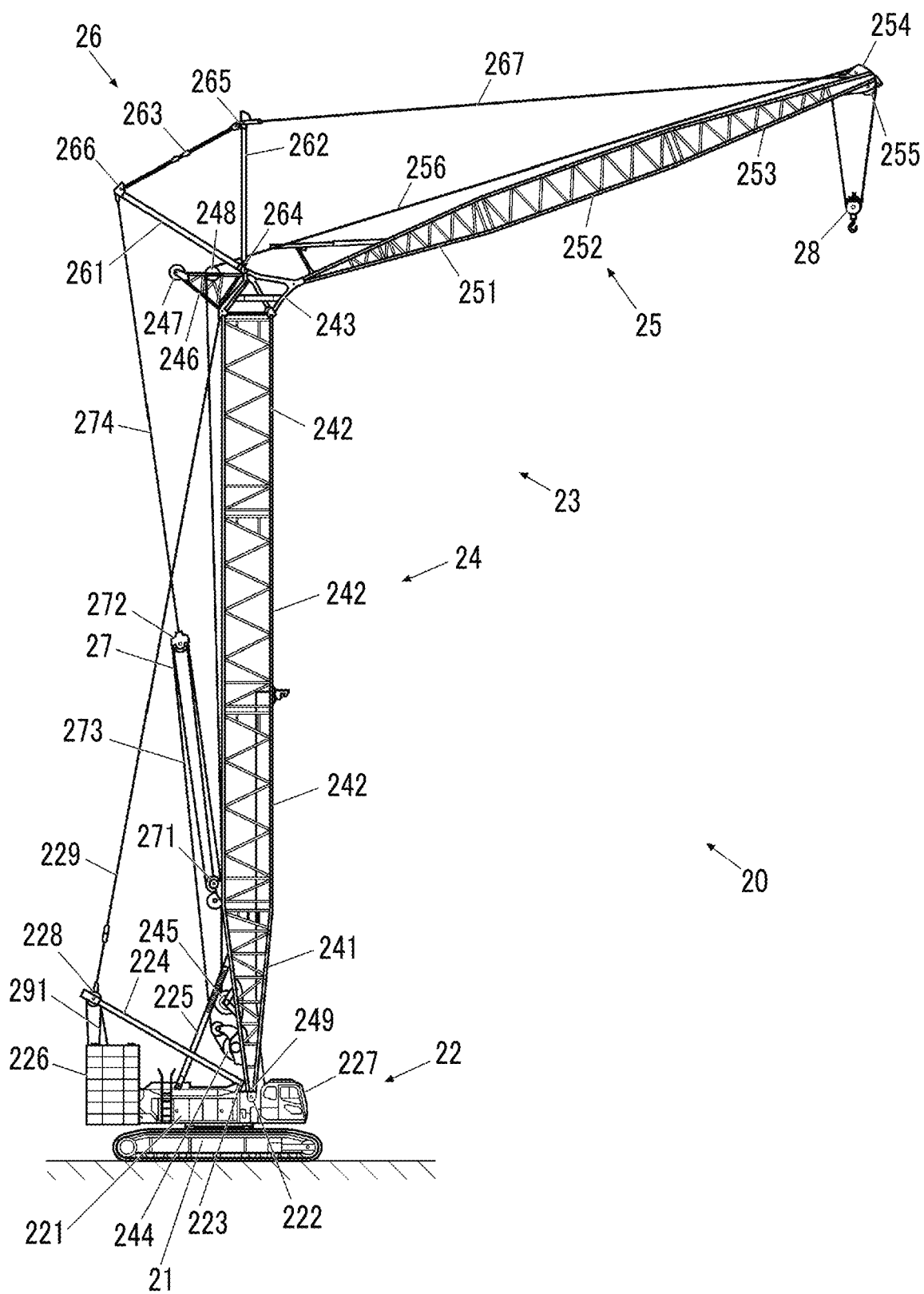
FIG. 3 is a side surface view of a crane body.

The upper boom 243 has a shape whose upper portion protrudes forward when the tower boom 24 is in a standing posture (posture illustrated in FIG. 3). A lower side portion of the upper boom 243 is attached to a tip (upper end) of the intermediate boom 242 located on the uppermost side. The tower jib 25 (to be described later) is attached to a front end side of the upper boom 243 to be capable of derricking, and the tower strut 26 (to be described later) is attached to an upper end side of the upper boom 243 to be capable of oscillating. In addition, a triangular sheave bracket 246 projects rearward in the upper boom 243. A tower guide sheave 247 and a guide sheave 248 are attached to the sheave bracket 246 to be rotatable.

The tower jib 25 is attached to the tip of the upper boom 243 of the tower boom 24 to be capable of derricking. The tower jib 25 is configured to include a lower jib 251 whose base end is attached to upper boom 243 to be capable of derricking, an intermediate jib 252 attached to a tip of the lower jib 251, and an upper jib 253 provided in a tip of the intermediate jib 252. A guide sheave 254 and a point sheave 255 are attached to a tip side of the upper jib 253 to be rotatable. A main winding rope 256 (to be described later) is wound around the guide sheave 254 and the point sheave 255.

The tower strut 26 is attached to an upper end side of the upper boom 243 of the tower boom 24 to be capable of oscillating. The tower strut 26 connects a first strut 261, a second strut 262, and a third strut 263 by using a first connecting portion 264, a second connecting portion 265, and a third connecting portion 266. In this manner, the tower strut 26 is configured as a triangular structure.

Here, the first connecting portion 264 of the tower strut 26 is attached to the upper end side of the upper boom 243. In this manner, the tower strut 26 is attached to an upper end of the tower boom 24 to be capable of oscillating while the first connecting portion 264 serves as a fulcrum. In addition, one end of a pendant rope 267 is connected to the second connecting portion 265, and the other end of the pendant rope 267 is connected to the tip side of the upper jib 253 of the tower jib 25. Furthermore, a boom-side pendant rope 274 (to be described later) is connected to the third connecting portion 266.

The jib derricking winch 244 is attached to the lower boom 241 of the tower boom 24. The jib derricking winch 244 causes the tower jib 25 to perform derricking via the tower strut 26. The jib derricking winch 244 and the third connecting portion 266 of the tower strut 26 are connected to each other by a jib derricking rope 27.

The jib derricking rope 27 is provided between the jib derricking winch 244 and the tower strut 26. The jib derricking rope 27 is configured to include a lower spreader 271 having a plurality of sheaves attached to the intermediate boom 242 of the tower boom 24, an upper spreader 272 having a plurality of sheaves provided to face the lower spreader 271, a winding rope 273 wound around the jib derricking winch 244 in a state of being sequentially wound around the sheave of the lower spreader 271 and the sheave of the upper spreader 272, and a boom-side pendant rope 274 in which one end is connected to the upper spreader 272 and the other end is connected to the third connecting portion 266 of the tower strut 26.

Therefore, the winding rope 273 is wound and unwound by the jib derricking winch 244. In this manner, the upper spreader 272 moves close to and away from the lower spreader 271, and the tower strut 26 oscillates while the first connecting portion 264 serves as a fulcrum. The oscillation of the tower strut 26 is transmitted to the tower jib 25 via the pendant rope 267. In this manner, the tower jib 25 is configured to perform derricking on the tip side of the tower boom 24.

The main winding winch 245 is located in the vicinity of the upper side of the jib derricking winch 244, and is attached to the lower boom 241 of the tower boom 24. One end side of the main winding rope 256 is wound around the main winding winch 245. The other end of the main winding rope 256 is attached to a suspended load hook 28 via the guide sheave 248 of the sheave bracket 246, the guide sheave 254 of the tower jib 25, and the point sheave 255. Therefore, the main winding rope 256 is wound and unwound by the main winding winch 245 so that the suspended load hook 28 can be raised and lowered.

The backstop 225 is provided between the turning frame 221 and the lower boom 241 of the tower boom 24. The backstop 225 supports the standing tower boom 24 from behind.

A base end of the mast 224 is attached to the mast attachment portion 223 of the turning frame 221 to be pivotable. The tip of the mast 224 is a free end that is pivotable in upward, downward, forward, and rearward directions.

A boom spreader 228 is provided in the tip of the mast 224, and the boom spreader 228 and the upper boom 243 of the tower boom 24 are connected to each other via a pendant rope 229 having a certain length. In addition, a boom derricking rope 291 sequentially wound over the boom spreader 228 and a spreader (not illustrated) on the turning frame 221 side is wound around a tower boom derricking winch (not illustrated) provided in the turning frame 221.

Therefore, when the boom derricking rope 291 is wound by the tower boom derricking winch, the tower boom 24 can stand by pulling the pendant rope 229. On the other hand, when the boom derricking rope 291 is unwound by the tower boom derricking winch, the tower boom 24 can be laid down (lowered) to the ground side via the pendant rope 229.

Figure 4:
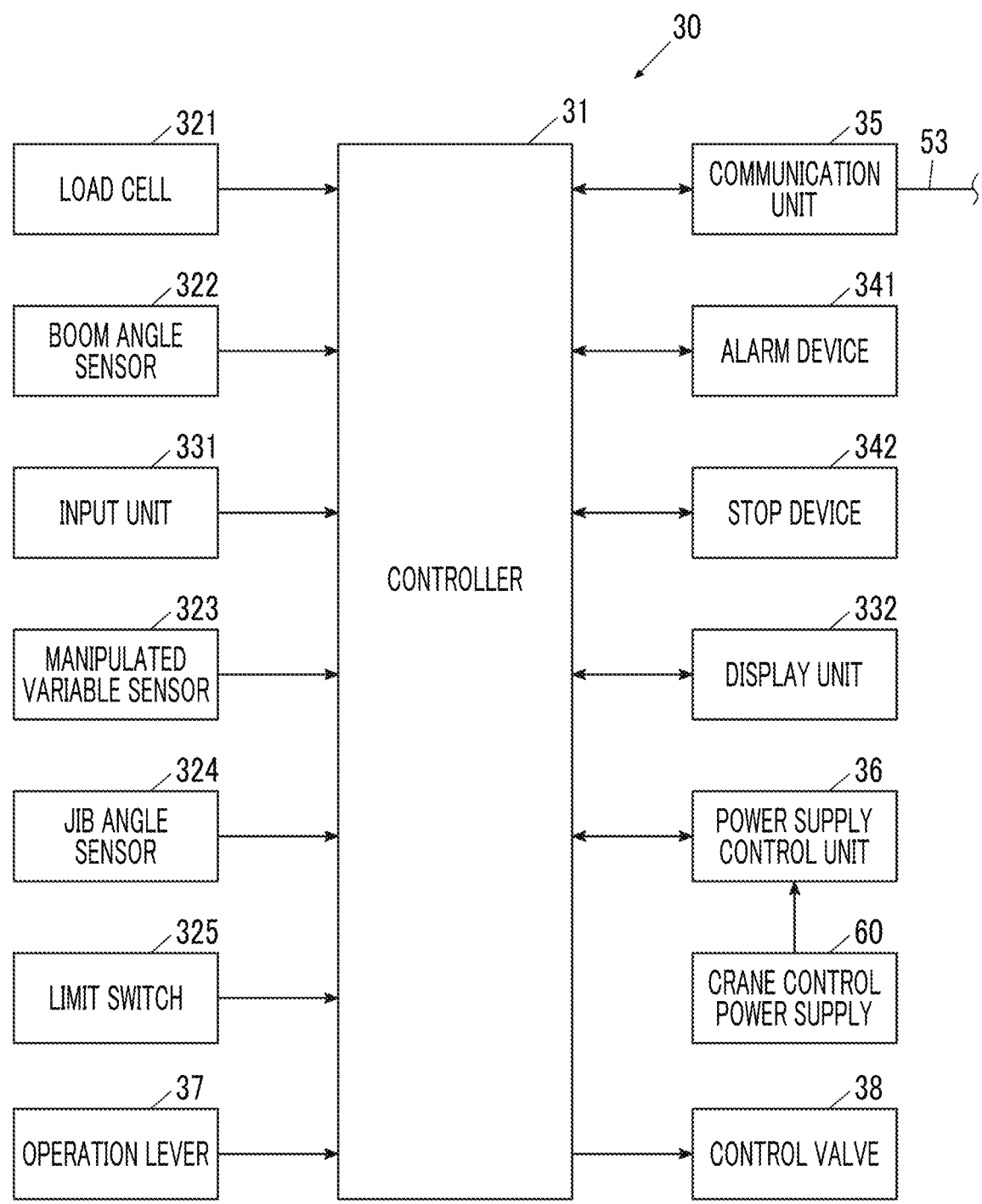
FIG. 4 is a block diagram illustrating a control system of a crane terminal.

FIG. 4 is a block diagram illustrating a configuration of the crane terminal 30. The crane terminal 30 is a control terminal mounted on the crane body 20, and performs control for various operations such as traveling, turning, and load suspending of the crane body 20 and processing for abnormality detection.

The crane terminal 30 includes a controller 31 configured to include a CPU, a ROM and RAM which are storage devices, and a calculation processing device including other peripheral circuits.

As illustrated in FIG. 4, a load cell 321, a boom angle sensor 322, a manipulated variable sensor 323, a jib angle sensor 324, a limit switch 325, an input unit 331, a display unit 332, an alarm device 341, a stop device 342, a communication unit 35, a power supply control unit 36, an operation lever 37, and a control valve 38 are connected to the controller 31.

The load cell 321 is attached to the boom spreader 228, detects tension acting on the boom derricking rope 291 that causes the tower boom 24 to perform derricking, and outputs a control signal corresponding to the detected tension to the controller 31.

For example, the input unit 331 is a touch panel, and outputs a control signal corresponding to an operation from a worker to the controller 31. The worker can operate the input unit 331 to set the number of application times of the main winding rope 256, the length of the tower boom, and the mass of the suspended load hook 28.

The boom angle sensor 322 is attached to a base end side of the tower boom 24, detects a derricking angle (hereinafter, also referred to as a boom angle) of the tower boom 24, and outputs a control signal corresponding to the detected boom angle to the controller 31. For example, as the boom angle, the boom angle sensor 322 detects a ground angle which is an angle with respect to a horizontal plane.

The jib angle sensor 324 is attached to the base end side of the tower jib 25, detects a derricking angle (hereinafter, also referred to as a jib angle) of the tower jib 25, and outputs a control signal corresponding to the detected jib angle to the controller 31. For example, as the jib angle, the jib angle sensor 324 detects the ground angle which is the angle with respect to the horizontal plane.

The limit switch 325 is provided in the tip portion of the tower jib 25, is operated when the suspended load hook 28 is wound more than a specified value, and notifies the controller 31 of a detection result.

For example, the manipulated variable sensor 323 detects a manipulated variable of a hydraulic pilot type operation lever, and outputs a control signal corresponding to the detected manipulated variable to the controller 31.

For example, the display unit 332 includes a touch panel type display that is also used as the input unit 331, and displays information on the suspended load or information on a work posture on a display screen, based on a control signal output from the controller 31.

The alarm device 341 issues an alarm, based on a control signal output from the controller 31.

The stop device 342 stops driving a hydraulic motor (not illustrated) connected to each of the main winding winch 245 and the jib derricking winch 244, based on a control signal output from the controller 31. For example, the stop device 342 is an electromagnetic switching valve which can cut off pressure oil supply from a hydraulic pump to a hydraulic motor.

The communication unit 35 is connected to the other end portion of the information transmission line 53 that connects the mobile unit 40 and the crane body 20, and performs wired communication with the mobile unit 40.

For example, the communication unit 35 transmits an operation command from the controller 31 to the mobile unit 40. In addition, the communication unit 35 receives the captured image data of the camera 41 from the mobile unit 40. A captured image based on the received captured image data is displayed on the display unit 332 under the control of the controller 31.

The controller 31 calculates a suspended load applied to the suspended load hook 28, based on outputs of the load cell 321 and the boom angle sensor 322. Then, when the suspended load is equal to or larger than a rated total load, a stop signal is output to the stop device 342, and an alarm signal is output to the alarm device 341.

In addition, when the controller 31 receives a notification of the limit switch 325, the controller 31 outputs the stop signal to the stop device 342, and outputs the alarm signal to the alarm device 341.

When the stop signal is input, the stop device 342 stops driving the jib derricking winch 244 and the main winding winch 245. The alarm device 341 issues an alarm when the alarm signal is input.

The control valve 38 is configured to include a plurality of valves that can be switched in accordance with a control signal from the controller 31.

For example, the control valve 38 includes a valve for hydraulic pressure supply, interruption, and rotation direction switching from the hydraulic pump included in the crane body 20 to the hydraulic motor that rotationally drives drive wheels of the lower traveling body 21, a valve for hydraulic pressure supply, interruption, and rotation direction switching from the hydraulic pump to the hydraulic motor that performs a turning operation of the rotating platform 22, a valve for hydraulic pressure supply, interruption, and rotation direction switching from the hydraulic pump to the hydraulic motor that rotationally drives the tower boom derricking winch, a valve for hydraulic pressure supply, interruption, and rotation direction switching from the hydraulic pump to the hydraulic motor that rotationally drives the jib derricking winch 244, and a valve for hydraulic pressure supply, interruption, and rotation direction switching from the hydraulic pump to the hydraulic motor that rotationally drives the main winding winch 245.

The operation lever 37 is configured to include a plurality of levers for inputting control signals for individually performing switching to various valves of the control valve 38 through the controller 31.

For example, a traveling lever which is one of the operation levers 37 inputs a switching signal to a valve that performs hydraulic pressure supply, interruption, and rotation direction switching for the hydraulic motor that rotationally drives the drive wheels of the above-described lower traveling body 21.

In addition, a turning lever which is one of the operation levers 37 inputs a switching signal to a valve that performs hydraulic pressure supply, interruption, and rotation direction switching from the above-described hydraulic pump to the hydraulic motor that performs a turning operation of the rotating platform 22.

In addition, a boom derricking lever which is one of the operation levers 37 inputs a switching signal to a valve that performs hydraulic pressure supply, interruption, and rotation direction switching from the above-described hydraulic pump to the hydraulic motor that rotationally drives the tower boom derricking winch.

In addition, a jib derricking lever which is one of the operation levers 37 inputs a switching signal to a valve that performs hydraulic pressure supply, interruption, and rotation direction switching from the above-described hydraulic pump to the hydraulic motor that rotationally drives the jib derricking winch 244.

In addition, a winding lever which is one of the operation levers 37 inputs a switching signal to a valve that performs hydraulic pressure supply, interruption, and rotation direction switching from the above-described hydraulic pump to the hydraulic motor that rotationally drives the main winding winch 245.

The controller 31 inputs control signals corresponding to hydraulic pressure supply, interruption, and rotation direction switching to each valve configuring the corresponding control valve 38 in accordance with an operation of various levers configuring the operation lever 37, and performs control on each hydraulic motor.

In this manner, a worker can operate the operation lever 37 to perform a traveling operation of the crane body 20, a turning operation of the rotating platform 22, a derricking operation of the tower boom 24, a derricking operation of the tower jib 25, and raising/lowering operations of the suspended load hook 28.

In addition, the crane body 20 includes a crane control power supply 60 that supplies power to each of all configurations of the crane terminal 30 including the controller 31 of the crane terminal 30.

The crane control power supply 60 includes a battery, and is connected to the power supply control unit 36 of the crane terminal 30 to supply required power to each configuration of the crane body 20.

In an example of the above-described crane terminal 30, the following configurations have been described. A configuration for performing abnormality processing on the load cell 321, the boom angle sensor 322, the manipulated variable sensor 323, the jib angle sensor 324, the limit switch 325, the alarm device 341, and the stop device 342 and a configuration for performing a normal operation on the operation lever 37 and the control valve 38 are controlled by a unified control system. However, the configuration for performing the abnormality processing and the configuration for performing the normal operation may include an individual controller for controlling each configuration, and may be configured to form a separate system.

Power Supply System

Figure 5:
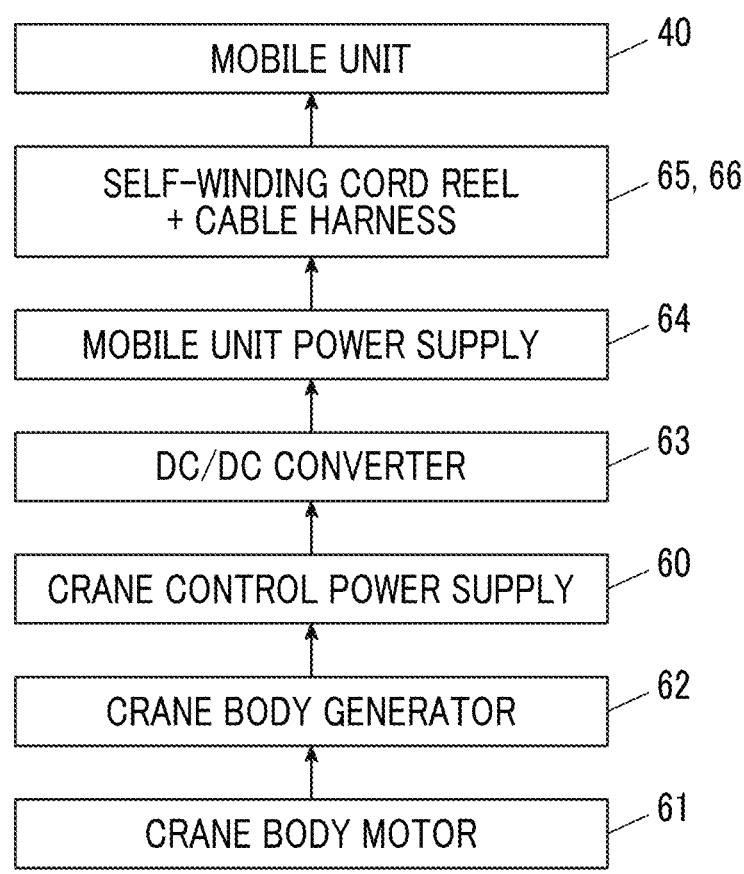
FIG. 5 is a block diagram of a power supply system example (1).
Figure 6:
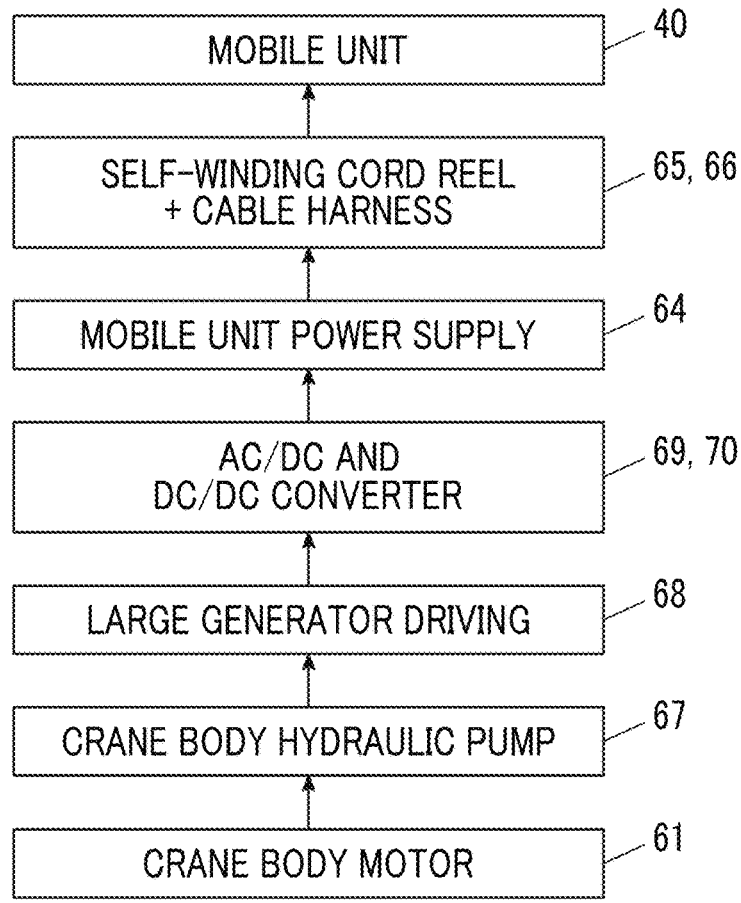
FIG. 6 is a block diagram of a power supply system example (2).
Figure 7:
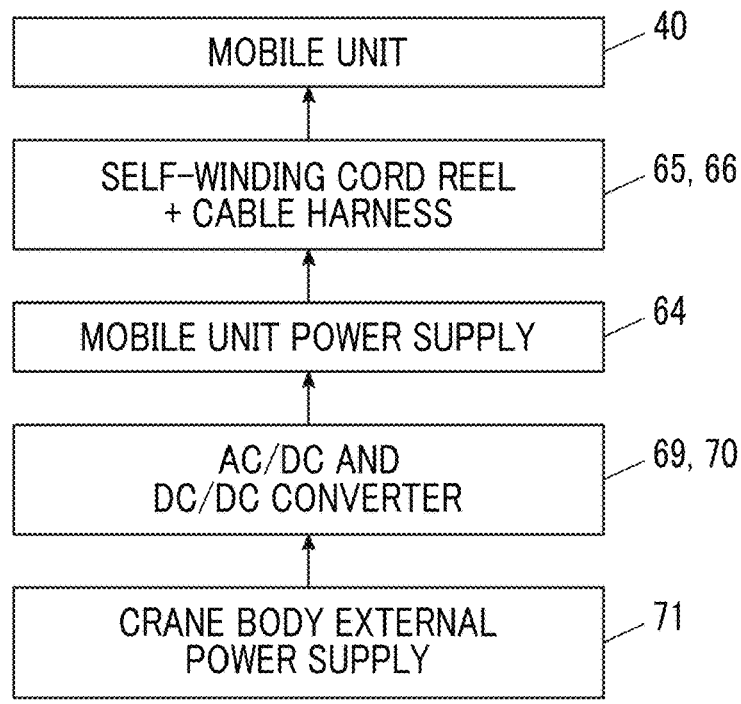
FIG. 7 is a block diagram of a power supply system example (3).

System examples (1) to (3) of power supply are individually illustrated in FIGS. 5 to 7. In supplying power from the crane body 20 to the mobile unit 40, any one of the system examples (1) to (3) can appropriately be selected depending on conditions therebetween.

The system example (1) of the power supply is applied to a case where power supply voltages of the crane control power supply 60 and the mobile unit 40 are both direct current and the power supply voltage of the mobile unit 40 is lower.

In the system example (1), as illustrated in FIG. 5, a crane body generator 62 generates the power by using a crane body motor 61 included in the crane body 20 as a drive source, and charges the crane control power supply 60 including a battery with the power. The crane body motor 61, the crane body generator 62, and the crane control power supply 60 have the same configuration as those which are mounted on the existing crane. That is, in addition to the crane body generator 62, the crane body motor 61 also drives a crane body hydraulic pump 67 (refer to FIG. 6) that supplies hydraulic pressure to various hydraulic actuators of the crane body 20. In addition, the crane control power supply 60 is a voltage supply source of the crane terminal 30 and various configurations connected to the crane terminal 30.

Then, a direct current (DC)/DC converter 63 converts a supply DC voltage of the crane control power supply 60 into a DC input voltage of the mobile unit power supply 64, and supplies the power to the mobile unit power supply 64 including the battery.

Furthermore, in a state where the power supply cable 51 whose one end portion is connected to the mobile unit power supply 64 is bundled together with a cable harness 65 that bundles an electric wire or a signal line directed toward a predetermined object of the crane body 20, the power supply cable 51 is wired to an installation position of the self-winding cord reel 66, and the other end portion of the power supply cable 51 unwound by the self-winding cord reel 66 is connected to the power supply control unit 52 of the mobile unit 40. Then, the power is supplied to the mobile unit 40 through the power supply cable 51.

In the above-described configuration, the crane body generator 62, the crane control power supply 60, and the mobile unit power supply 64 correspond to a "power supply unit" of the present invention.

When the power supply voltages of the crane control power supply 60 and the mobile unit 40 are equal to each other, the DC/DC converter 63 and the mobile unit power supply 64 can be omitted, and the power can be supplied to the mobile unit 40 from the crane control power supply 60.

The system example (2) of the power supply is applied to a case where the power supply voltage of the mobile unit 40 is the DC and is higher than the power supply voltage of the crane control power supply 60.

In the system example (2), as illustrated in FIG. 6, the crane body hydraulic pump 67 is driven by using the crane body motor 61 included in the crane body 20 as a drive source, and the hydraulic pressure output by the crane body hydraulic pump 67 is used to operate a large generator 68.

For example, the large generator 68 is externally attached on a counterweight 226 of the crane body 20.

The large generator 68 outputs an alternating current. Accordingly, the alternating current is converted into the direct current by an alternating current (AC)/DC converter 69.

Furthermore, the DC/DC converter 70 converts the supply DC voltage of the AC/DC converter 69 into the DC input voltage of the mobile unit power supply 64, and supplies the power to the mobile unit power supply 64.

Then, the power supply cable 51 intermediately bundled in the cable harness 65 is independently unwound from the self-winding cord reel 66, and is connected to the power supply control unit 52 of the mobile unit 40. The power is supplied to the mobile unit 40 therethrough. The large generator 68 may also be used as a power source for the attachment such as a riff mug and various electric components of the crane.

In the above-described configuration, the large generator 68 and the mobile unit power supply 64 correspond to a "power supply unit" of the present invention.

The system example (3) of the power supply is applied to a case where the crane body 20 receives the power from the outside without generating the power by itself.

In the system example (3), as illustrated in FIG. 7, the AC power input from a crane body external power supply 71 outside the machine of the crane body 20 is converted into the DC power by the AC/DC converter 69, and the DC/DC converter 70 converts the DC power into the DC input voltage of the mobile unit power supply 64, thereby supplying the power to the mobile unit power supply 64.

Then, the power supply cable 51 intermediately bundled in the cable harness 65 is independently unwound from the self-winding cord reel 66, and is connected to the power supply control unit 52 of the mobile unit 40. The power is supplied to the mobile unit 40 therethrough.

In the above-described configuration, the crane body external power supply 71 and the mobile unit power supply 64 correspond to a "power supply unit" of the present invention.

Wiring Example of Power Supply

Figure 8:
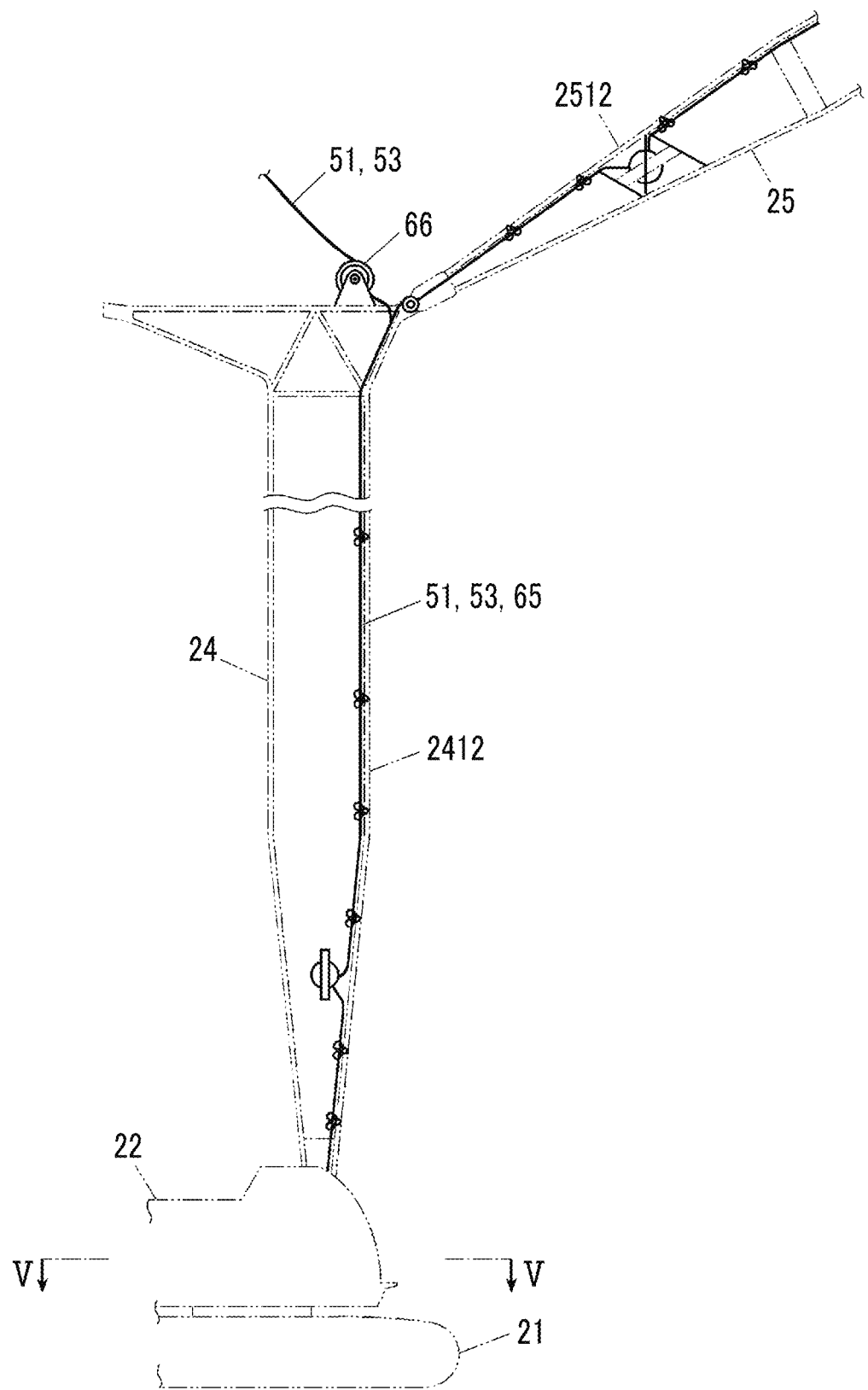
FIG. 8 is a view for describing a wiring example for supplying power through a tower boom and a tower jib.

A wiring example for supplying the power from the crane body 20 to the mobile unit 40 will be described with reference to FIGS. 8 to 10. FIG. 8 illustrates a wiring example for supplying the power through the tower boom 24 and the tower jib 25, and FIG. 9 illustrates an internal wiring example in a horizontal cross section of the rotating platform 22 which is taken along line V-V in FIG. 8.

Figure 9:
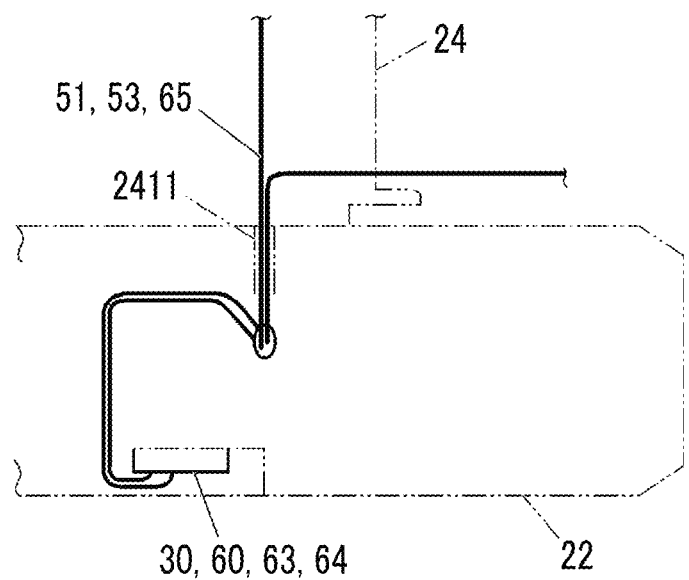
FIG. 9 is a view for describing an internal wiring example in a horizontal cross section of a rotating platform which is taken along line V-V line in FIG. 8.

In addition, FIGS. 8 and 9 show a wiring example in the above-described system example (1) of the power supply.

As illustrated in FIG. 9, the crane control power supply 60, a DC/DC converter 63, the crane terminal 30, and the mobile unit power supply 64 are disposed in the vicinity of a rear side surface portion inside the rotating platform 22 of the crane body 20.

Then, one end portion of the cable harness 65 that bundles a power supply line and a signal line for the load cell 321, the boom angle sensor 322, the jib angle sensor 324, or the limit switch 325 which are provided in the tower boom 24 and the tower jib 25 is connected to the mobile unit power supply 64.

One end portion of the power supply cable 51 connected to the mobile unit 40 is connected to the mobile unit power supply 64, and one end portion of the information transmission line 53 connected to the mobile unit 40 is connected to the communication unit 35 of the crane terminal 30. Then, the power supply cable 51 and the information transmission line 53 are bundled integrally with the above-described cable harness 65, are wired along the same route as the cable harness 65, and are appropriately fixed at a plurality of locations of the tower boom 24 and the tower jib 25 together with the cable harness 65. That is, the power supply cable 51 and the information transmission line 53 are fixed to the tower boom 24 together with the wires (power supply line and signal line) of the electric components (for example, the load cell 321, the boom angle sensor 322, the jib angle sensor 324 or the limit switch 325, but the electric components are not limited thereto) provided in the tower boom 24 and the tower jib 25. In the present embodiment, the power supply cable 51 and the information transmission line 53 are bundled with the cable harness 65 in which all wires are bundled. However, but both may be fixed together with only some wires. Only one of the power supply cable 51 and the information transmission line 53 may be fixed together with the wires, or each may be fixed together with a separate wire. Hereinafter, the cable harness 65, the power supply cable 51 and the information transmission line 53 which are integrally bundled with the cable harness 65 will collectively be referred to as the "cable harness 65".

As illustrated in FIG. 9, the cable harness 65 whose one end portion is connected to the mobile unit power supply 64 is wired to the outside of the rotating platform 22 from the inside of the rotating platform 22 through the inside of the foot pin 2411 of the tower boom 24.

Then, as illustrated in FIG. 8, the cable harness 65 wired to the outside of the rotating platform 22 is wired to an upper end portion of the tower boom 24 along the main pipe 2412 of the tower boom 24. Furthermore, the cable harness 65 is wired to the tip portion of the tower jib 25 along the main pipe 2512 of the tower jib 25 connected to the upper end portion of the tower boom 24.

The self-winding cord reel 66 is disposed in the upper end portion of the tower boom 24. In the upper end portion of the tower boom 24, the power supply cable 51 and the information transmission line 53 are branched into the self-winding cord reel 66 side provided in the upper end portion of the tower boom 24 and the self-winding cord reel 66 (not illustrated) side provided in the tip portion of the tower jib 25.

The power supply cable 51 and the information transmission line 53 which are branched in the upper end portion of the tower boom 24 are individually connected to the power supply cable 51 and the information transmission line 53 which are wound around the self-winding cord reel 66.

In addition, the power supply cable 51 and the information transmission line 53 which extend to the self-winding cord reel 66 side provided in the tip portion of the tower jib 25 are also individually connected to the power supply cable 51 and the information transmission line 53 which are wound around the self-winding cord reel 66 provided in the tip portion of the tower jib 25.

Figure 10:
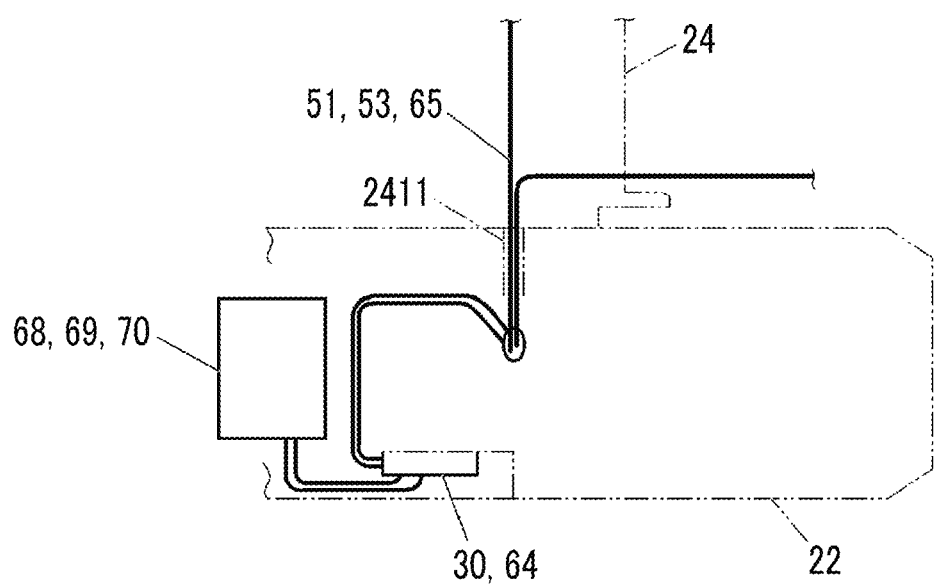
FIG. 10 is a view for describing another wiring example for supplying the power through the tower boom and the tower jib.

FIG. 10 illustrates a wiring example in the above-described system example (2) of the power supply.

In this case, the large generator 68, the AC/DC converter 69, and the DC/DC converter 70 are disposed on the counterweight 226 (not illustrated in FIG. 10) on an outer rear side of the rotating platform 22 of the crane body 20.

Then, these are connected to the mobile unit power supply 64 disposed on an inner rear side of the rotating platform 22. The power supply cable 51 whose one end portion is connected to the mobile unit power supply 64 and the information transmission line 53 whose one end portion is connected to the crane terminal 30 together with the cable harness 65 are wired to the outside of the rotating platform 22 through the inside of the foot pin 2411 of the tower boom 24.

Then, s route subsequent thereto is the same as that in the example in FIG. 8.

Self-Winding Cord Reel

The self-winding cord reel 66 includes a drum around which a wire rod (referred to as a composite wire rod) in which the power supply cable 51, the information transmission line 53, and the fall prevention wire rod 54 are integrated, and a return spring that rotates the drum in a winding direction. When the mobile unit 40 moves close to the self-winding cord reel 66, the composite wire rod having a surplus length can automatically be wound. In this way, in the present embodiment, the fall prevention wire rod 54 is not provided between the rotating platform 22 and the self-winding cord reel 66, and is provided only between the self-winding cord reel 66 and the mobile unit 40. In addition, it is preferable that the fall prevention wire rod 54 is provided separately from the power supply cable 51 or the information transmission line 53. However, without requiring the integrated composite wire rod, the fall prevention wire rod 54 may be connected to the crane 10 or the mobile unit 40 at a location different from that of the power supply cable 51 or the information transmission line 53.

The self-winding cord reel 66 may include a built-in motor for winding the drum to perform winding control.

For example, in the winding control, the controller 31 (or other dedicated controller) of the crane terminal 30 acquires a current position of the mobile unit 40 detected by the positioning unit 421 included in the above-described mobile unit 40 via the information transmission line 53, and controls the motor which winds and unwinds the drum to unwind or wind the composite wire rod in accordance with a required length from the current position of the mobile unit 40.

Alternatively, a sensor may be provided to detect tension of the composite wire rod unwound from the drum. The controller 31 (or other dedicated controller) may control the motor which winds the drum so that the composite wire rod is unwound when the detected tension exceeds a prescribed range, and the composite wire rod is wound when the detected tension is smaller than the prescribed range.

Technical Effects of Embodiments of the Invention

In the above-described crane 10, the crane body 20 has the power supply unit, and the power supply unit is connected to the mobile unit 40 by the power supply cable 51.

Therefore, the mobile unit 40 can be operated for a long period of time while weight saving of the mobile unit 40 is achieved. Therefore, the mobile unit 40 can carry out various types of work over a long period of time.

In addition, the mobile unit 40 does not require the power source. Accordingly, it is easy to introduce the mobile unit 40 having a large size.

In addition, the power supply cable 51 can prevent the mobile unit 40 from falling.

In addition, when the power is supplied to the mobile unit 40 from the crane control power supply 60 which supplies the power to the controller 31 for controlling the operation of the crane body 20, a power supply dedicated to the mobile unit 40 is not required, and the existing configuration of the crane body 20 can be used. Accordingly, the mobile unit 40 can easily be mounted at low cost.

In addition, when the power supply cable 51 is fixed to the tower boom 24 of the crane body 20, the mobile unit 40 can easily be disposed at any desired position on the tower boom 24.

In addition, the power supply cable 51 is fixed to the tower boom 24 together with the wire of the electric component such as the cable harness 65. Accordingly, an installation route of the cable harness 65 can be used as it is for installing the power supply cable 51, and the power supply cable 51 can easily be installed.

In addition, the information transmission line 53 is also provided together with the cable harness 65. Accordingly, the information transmission line 53 can also easily be installed. In addition, the information transmission line 53 is provided separately from the power supply cable 51. In this manner, a large amount of image data can quickly be transmitted to the crane body 20 from the mobile unit 40.

Furthermore, the fall prevention wire rod 54 is provided by being bundled with the power supply cable 51. Accordingly, while disconnection of the power supply cable 51 is suppressed, fall prevention of the mobile unit 40 can be achieved. In addition, the fall prevention wire rod 54 is provided separately from the power supply cable 51. In this manner, a material suitable for the fall prevention can be adopted, and the fall prevention can more reliably be achieved.

In addition, the self-winding cord reel 66 for feeding and winding the power supply cable 51 is provided. Accordingly, occurrence of a surplus length of the power supply cable 51 can be suppressed, and occurrence of hooking or entangling can be suppressed.

Others

In addition, details in the above-described embodiments of the invention can be appropriately changed within the scope not departing from the concept of the invention.

Figure 11:
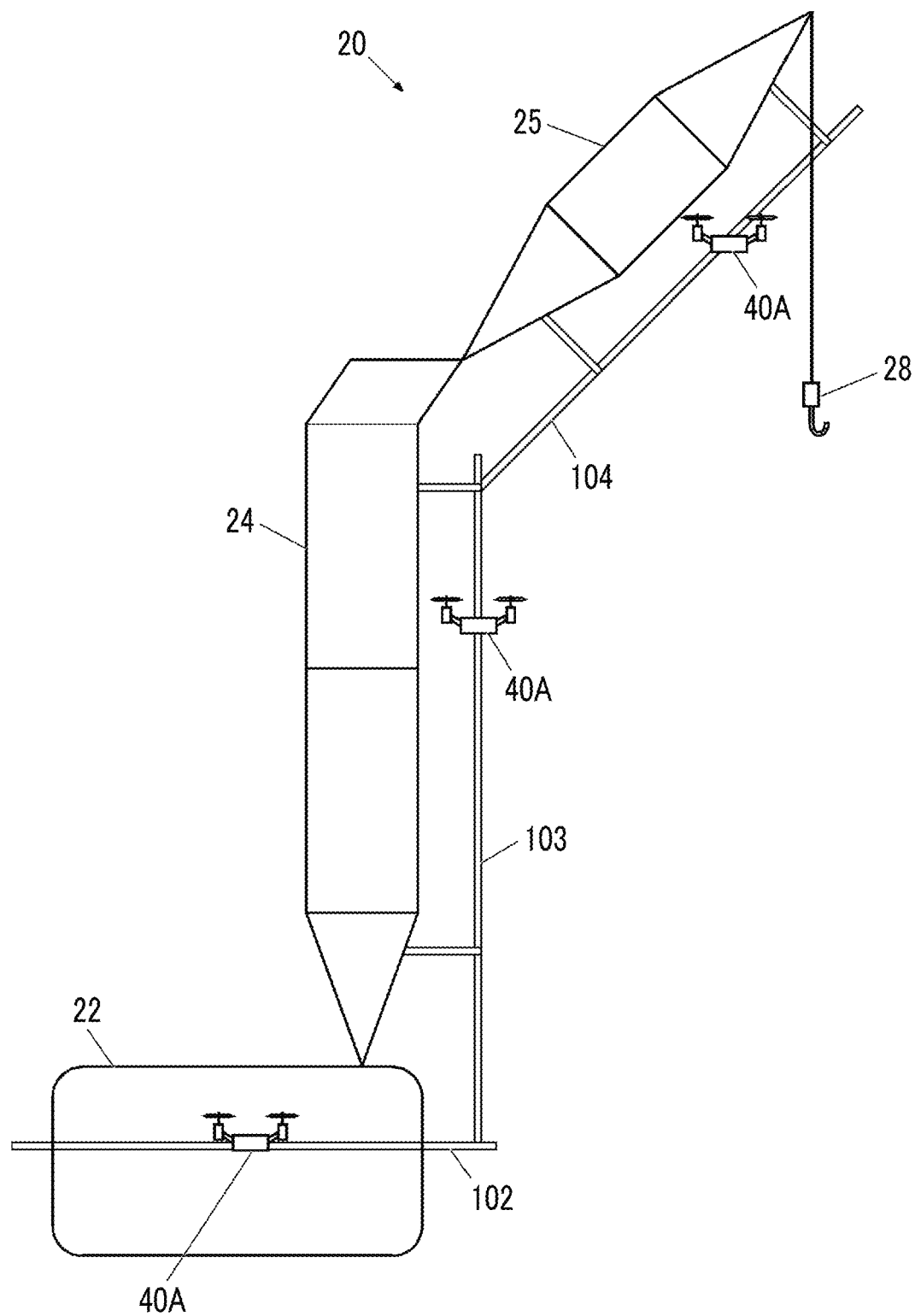
FIG. 11 is a view for describing another disposition example of the mobile unit with respect to the crane body.

FIG. 11 is a view for describing another disposition example of mobile units 40A with respect to the crane body 20.

As in each of the mobile units 40A illustrated in the drawing, a configuration may be adopted in which the mobile units 40A are supported to be slidable along the rail-shaped guide members 102 to 104 supported by the crane body 20.

A slider (not illustrated) slidable along each of the guide members 102 to 104 is provided in each of the guide member 102-104, and a support member (not illustrated) supporting each of the mobile units 40A extends from the slider. The support member supports each of the mobile units 40A with a degree of freedom so that the posture of each of the mobile units 40A can be changed within a certain range.

In addition, it is preferable to take measures as follows. A turning stopper is provided so that each of the mobile units 40A does not turn around each of the guide members 102 to 104. Each of the guide members 102 to 104 does not have a circular cross section. Each of the guide members 102 to 104 is configured to include each of the plurality of rails.

In addition, in a case of a configuration in which each of the mobile units 40A is supported to be movable along each of the guide members 102 to 104, each of the mobile units 40A may have a structure which cannot fly, and can travel along each of the guide members 102 to 104. That is, the mobile units 40A may be configured to be movable around the crane body, and a movement form thereof is not particularly limited.

In addition, in this case, a configuration may be adopted in which the power is supplied to each of the mobile units 40A from the crane body 20 via the power supply cable 51. However, a rail-shaped power supply path member may be formed along each of the guide members 102 to 104, and a contact point which comes into contact with the power supply path member may be provided on each of mobile units 40A side. In this case, the power can be supplied to each of the mobile units 40A from the crane body 20 via the power supply path member and the contact point. In addition, an information transmission path member may be provided by using the same structure.

Figure 12:
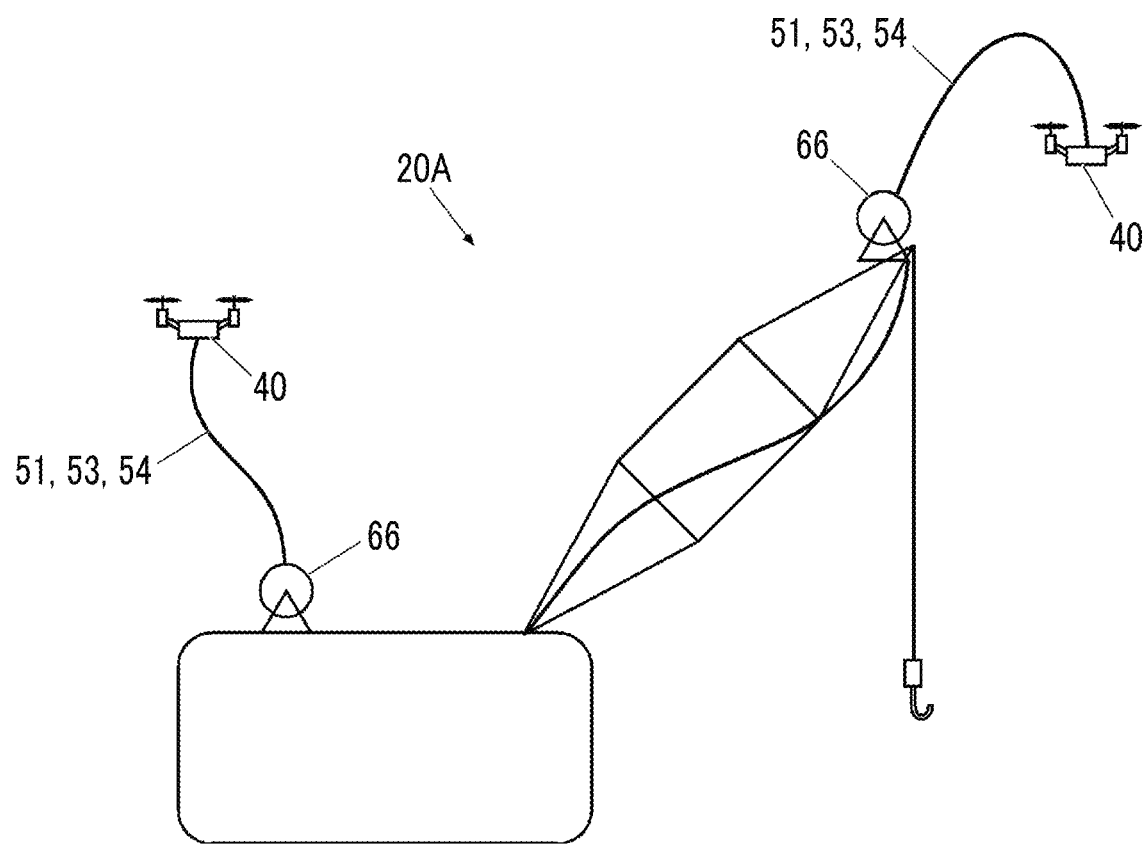
FIG. 12 is a view for describing a schematic configuration of a crane in which a mobile unit is mounted on a crawler crane.

In addition, in the above-described embodiment, the tower crane has been described as an example of the crane body 20. However, but without being limited thereto, a configuration may be adopted in which the mobile unit 40 is connected to a crane body 20A including a crawler crane illustrated in FIG. 12 via the power supply cable 51, the information transmission line 53, and the fall prevention wire rod 54.

In addition, the present invention is not limited to the crawler crane. In addition to the mobile type crane such as a wheel crane and a truck crane, the present invention is applicable to various cranes such as a port crane, a ceiling crane, a jib crane, a portal crane, an unloader, and a stationary type crane.

In addition, without being limited to the crane including the suspended load hook, a crane for suspending an attachment such as a magnet and an earth drill bucket is also an applicable object of the present invention.

The crane according to the present invention has industrial applicability for the crane having the mobile unit moving around the crane body.

It should be understood that the invention is not limited to the above-described embodiment, but may be modified into various forms on the basis of the spirit of the invention. Additionally, the modifications are included in the scope of the invention.

What is claimed is:

1. A crane comprising:
   a crane body; and
   a mobile unit moving around the crane body,
   wherein the crane body includes a front attachment capable of derricking, a hook suspended by a rope extending from the front attachment, a power supply unit, and a power supply path member connected to the mobile unit and supplying power to the mobile unit from the power supply unit, and
   the power supply path member is a separate member from the rope suspending the hook, is fixed to the front attachment, and extends from the front attachment toward the mobile unit.

2. The crane according to claim 1,
wherein the power supply unit supplies power to a controller that controls an operation of the crane, and
the power supply unit increases or decreases a voltage of the power supplied to the mobile unit relative to a voltage of the power used to control the operation of the crane.

3. The crane according to claim 1,
wherein the power supply path member is fixed to a boom of the crane body.

4. The crane according to claim 1, further comprising:
a sensor for detecting a state of the crane, which is provided on the front attachment of the crane body,
wherein the power supply path member is fixed to a boom together with a wire of the sensor for detecting the state of the crane.

5. The crane according to claim 1,
wherein an information transmission path member connecting the mobile unit and the crane body is provided separately from the power supply path member.

6. The crane according to claim 1,
wherein a fall prevention wire rod that connects the mobile unit and the crane body to prevent the mobile unit from falling is provided separately from the power supply path member.

7. The crane according to claim 1, further comprising:
a winding mechanism for feeding and winding the power supply path member,
wherein the winding mechanism feeds and winds the power supply path member according to a position of the mobile unit.

8. The crane according to claim 1,
wherein the mobile unit includes an imaging unit that images at least a portion of the crane body.

9. The crane according to claim 8,
wherein the imaging unit images at least a portion of the crane body in a state where the mobile unit has moved below an uppermost part of the crane body.

10. The crane according to claim 6, further comprising
a winding mechanism for feeding and winding the power supply path member,
wherein the fall prevention wire rod is provided between the winding mechanism and the mobile unit.

11. The crane according to claim 10,
wherein the crane body includes a lower traveling body and a rotating platform mounted on the lower traveling body to be capable of turning, and
the fall prevention wire rod is not provided between the rotating platform and the winding mechanism.

12. The crane according to claim 1,
wherein the crane body includes a rail-shaped guide member,
the rail-shaped guide member movably supports the mobile unit along a rail-shaped portion, and
the rail-shaped guide member is provided with the power supply path member.

13. The crane according to claim 1,
wherein the mobile unit includes a drive unit that outputs a thrust force for a movement operation of the mobile unit and a battery that supplies power to the drive unit, and
the battery supplies power to the drive unit in a case where the power supply from the power supply unit is abnormal.

14. The crane according to claim 1,
wherein the mobile unit is a drone that includes a gripping device capable of gripping an assist rope.

15. The crane according to claim 1,
wherein the crane body includes a rotatable rotating platform,
the front attachment includes a boom that is derrickable relative to the rotating platform, and a foot pin provided on the rotating platform of the boom, and
the power supply path member is wired to an outside of the rotating platform through an inside of the foot pin.

16. A crane body comprising:
a power supply unit that supplies power to a mobile unit moving around the crane body;
a rotating platform that is capable of turning;
a front attachment that is capable of derricking with respect to the rotating platform;
a hook suspended by a rope extending from the front attachment; and
a power supply path member connected to the mobile unit and supplying power to the mobile unit from the power supply unit,
wherein the power supply path member is a separate member from the rope suspending the hook, is fixed to the front attachment, and extends from the front attachment toward the mobile unit.

17. The crane according to claim 16,
wherein the crane body is imaged by an imaging unit of the mobile unit in a state where the mobile unit has moved below an uppermost part of the crane body.

18. A mobile unit moving around a crane body to carry out auxiliary work,
wherein the mobile unit is connected to a power supply unit provided in the crane body via a power supply path member, and receives power supplied from the power supply unit, and
the power supply path member is a separate member from a rope suspending a hook of the crane body, is fixed to a front attachment of the crane body, and extends from the front attachment.

19. The crane according to claim 18, further comprising:
an imaging unit that images at least a portion of the crane body in a state where the mobile unit has moved below an uppermost part of the crane body.

* * * * *